(12) United States Patent
Budinski et al.

(10) Patent No.: US 7,687,177 B2
(45) Date of Patent: Mar. 30, 2010

(54) NITRIDED BIPOLAR PLATES

(75) Inventors: Michael K. Budinski, Pittsford, NY (US); Gayatri Vyas, Rochester Hills, MI (US); Augusto O. Kunrath Neto, Golden, CO (US); John J. Moore, Evergreen, CO (US)

(73) Assignee: General Motors Corporation, Detroit, MI (US)

( * ) Notice: Subject to any disclaimer, the term of this patent is extended or adjusted under 35 U.S.C. 154(b) by 30 days.

(21) Appl. No.: 11/155,182

(22) Filed: Jun. 17, 2005

(65) Prior Publication Data

US 2006/0053627 A1 Mar. 16, 2006

Related U.S. Application Data

(60) Provisional application No. 60/610,364, filed on Sep. 16, 2004.

(51) Int. Cl.
*H01M 4/86* (2006.01)
*B21D 51/16* (2006.01)

(52) U.S. Cl. .......................................... 429/34; 29/890
(58) Field of Classification Search .................. 429/34; 29/890
See application file for complete search history.

(56) References Cited

U.S. PATENT DOCUMENTS 6,238,490 B1 * 5/2001 Bell et al. ................... 148/222
6,663,755 B2 12/2003 Gorokhovsky 2004/0048134 A1 * 3/2004 Kihira et al. ................... 429/34
2006/0090817 A1 * 5/2006 Somers et al. ............... 148/218

OTHER PUBLICATIONS

L.C. Gontijo, R. Machado, S.E. Kuri, L.C. Castelletti, P.A.P. Nascente; Thin Solid Films; Abstract—Corrosion Resistance of the Layers Formed on the Surface of Plasma-Nitrided AISI 304L Steel; 33rd International Conference on Metallurgical Coatings and Thin Films—ICMCTF 2006; Nov. 23, 2006; pp. 1093-1096; vol. 515; Issue 3.
M.J. Carbonari, J.R. Martinelli; Effects of Hot Isostatic Pressure on Titanium Nitride Films Deposited by Physical Vapor Deposition; Materials Research; 2001; pp. 163-168; vol. 4; No. 3.
Mehmet Capa, Muzaffer Tamer, Turgut Gulmez, Gengiz Tahir Bodur; Life Enhancement of Hot-Forging Dies by Plasma-Nitriding; Turk J. Engin Environ Sci; 2000; pp. 111-117.
Patrick R. Leclair; Titanium Nitride Thin Films by the Electron Shower Process; Department of Materials Science and Engineering; Massachusetts Institute of Technology; May 1998.

* cited by examiner

*Primary Examiner*—Patrick Ryan
*Assistant Examiner*—Karie O'Neill Apicella
(74) *Attorney, Agent, or Firm*—Dinsmore & Shohl LLP

(57) ABSTRACT

Nitrided bipolar plates and a scheme for their fabrication are provided. The present invention also contemplates device incorporating bipolar plates according to the present invention. For example, in accordance with one embodiment of the present invention, an electrochemical conversion assembly is provided. The electrochemical conversion cells of the assembly are separated by respective bipolar plates comprising an alloy of Fe and Cr. A surface portion of the bipolar plates comprises a single phase nitrided structure. According to another embodiment of the present invention, a plasma nitriding process is utilized to create a single phase nitrided structure along a surface portion of respective ones of said bipolar plates.

10 Claims, 4 Drawing Sheets

US 7,687,177 B2

NITRIDED BIPOLAR PLATES

CROSS-REFERENCE TO RELATED APPLICATIONS

This application claims the benefit of U.S. Provisional Application Ser. No. 60/610,364, filed Sep. 16, 2004.

BACKGROUND OF THE INVENTION

The present invention relates to electrochemical conversion cells, commonly referred to as fuel cells, which produce electrical energy by processing first and second reactants, e.g., through oxidation and reduction of hydrogen and oxygen. By way of illustration and not limitation, a typical cell comprises a polymer membrane (e.g., a proton exchange membrane) that is positioned between a pair of gas diffusion media layers and catalyst layers. A cathode plate and an anode plate are positioned at the outermost sides adjacent the gas diffusion media layers, and the preceding components are tightly compressed to form the cell unit.

The voltage provided by a single cell unit is typically too small for useful application. Accordingly, a plurality of cells are typically arranged and connected consecutively in a "stack" to increase the electrical output of the electrochemical conversion assembly or fuel cell. In this arrangement, two adjacent cell units can share a common polar plate, which serves as the anode and the cathode for the two adjacent cell units it connects in series. Such a plate is commonly referred to as a bipolar plate and typically includes a flow field defined therein to enhance the delivery of reactants and coolant to the associated cells.

Bipolar plates for fuel cells are typically required to be electrochemically stable, electrically conductive, and inexpensive. Metallic bipolar plates are advantageous because they can be made very thin (e.g., <0.25 mm) and can be formed into a final shape by inexpensive metal forming techniques, such as stamping. However, metal plates are susceptible to corrosion. An active corrosion process in a fuel cell stack can increase the membrane resistance and the contact resistance of the bipolar plates, reducing the power density of the stack. Stainless steels have been considered for use in forming bipolar plates, due primarily to their inherent corrosion resistance and the relatively inexpensive material cost. Accordingly, the present inventors have recognized a need to provide for improved schemes for enabling the use of Stainless steels in forming bipolar plates.

BRIEF SUMMARY OF THE INVENTION

According to the present invention, nitrided bipolar plates and a scheme for their fabrication are provided. The present invention also contemplates device incorporating bipolar plates according to the present invention. For example, in accordance with one embodiment of the present invention, an electrochemical conversion assembly is provided comprising a plurality of electrochemical conversion cells and a plurality of electrically conductive bipolar plates. The electrochemical conversion cells are configured to communicate with first and second reactant supplies. Adjacent ones of the electrochemical conversion cells are separated by respective ones of the plurality of bipolar plates. The bipolar plates comprise an alloy comprising Fe and Cr. A surface portion of the bipolar plates, comprises a single phase nitrided structure. The single phase nitrided structure of the bipolar plates is in contact with portions of the electrochemical conversion cells.

In accordance with another embodiment of the present invention, a method of fabricating an electrochemical conversion assembly comprising a plurality of electrochemical conversion cells and a plurality of electrically conductive bipolar plates is provided. Bipolar plates are formed from an alloy comprising Fe and Cr. A plasma nitriding process is utilized to create a single phase nitrided structure along a surface portion of respective ones of the bipolar plates. Adjacent ones of the electrochemical conversion cells are positioned such that they are separated by respective ones of the plurality of bipolar plates and such that the single phase nitrided structure of the bipolar plates is in contact with portions of the electrochemical conversion cells.

Accordingly, it is an object of the present invention to provide nitrided bipolar plates and a scheme for their fabrication. Other objects of the present invention will be apparent in light of the description of the invention embodied herein.

BRIEF DESCRIPTION OF THE SEVERAL VIEWS OF THE DRAWINGS

The following detailed description of specific embodiments of the present invention can be best understood when read in conjunction with the following drawings, where like structure is indicated with like reference numerals, where various components of the drawings are not necessarily illustrated to scale, and in which.

DETAILED DESCRIPTION

Figure 1:
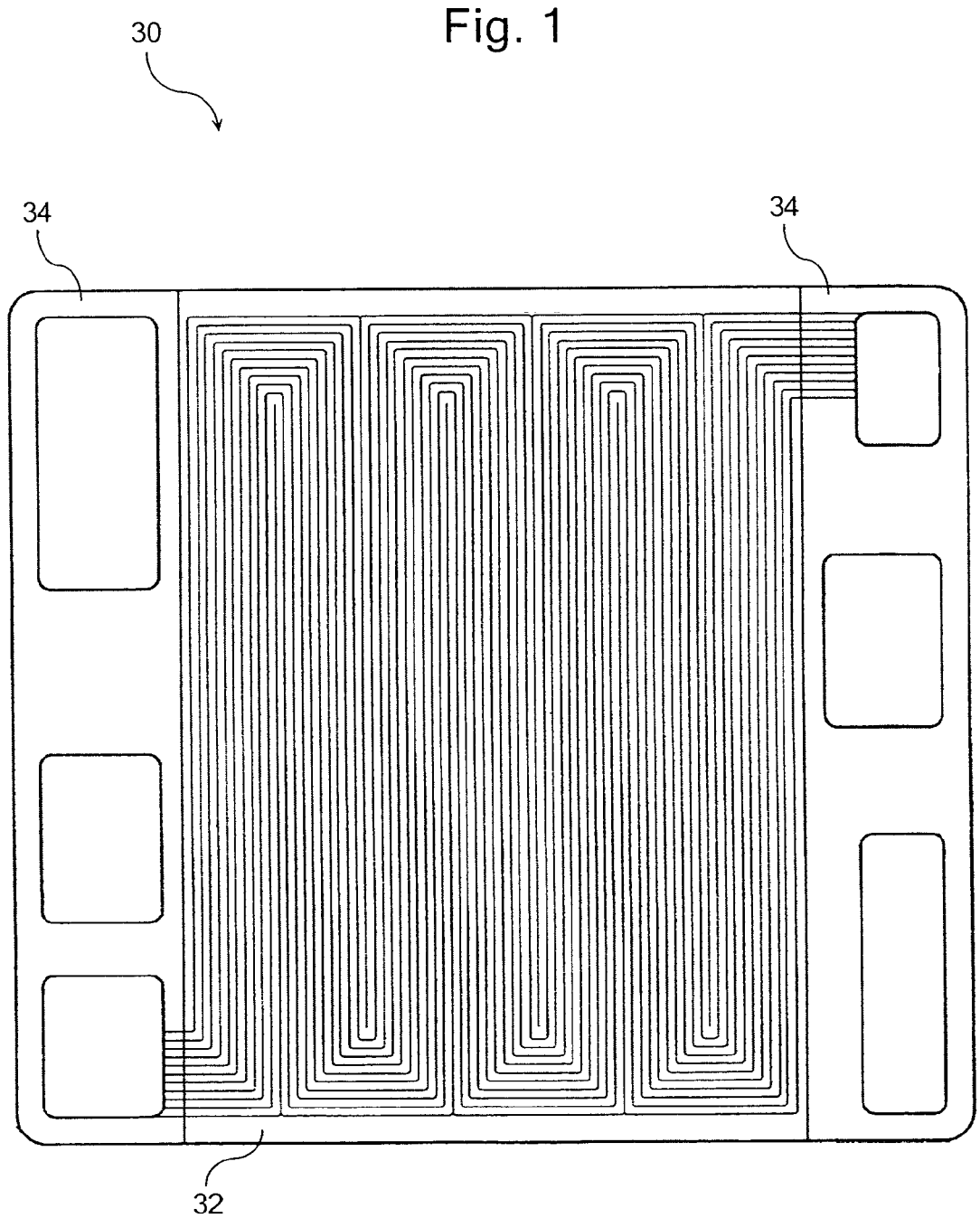
FIG. 1 is an illustration of a bipolar plate according to one embodiment of the present invention.
Figure 2:
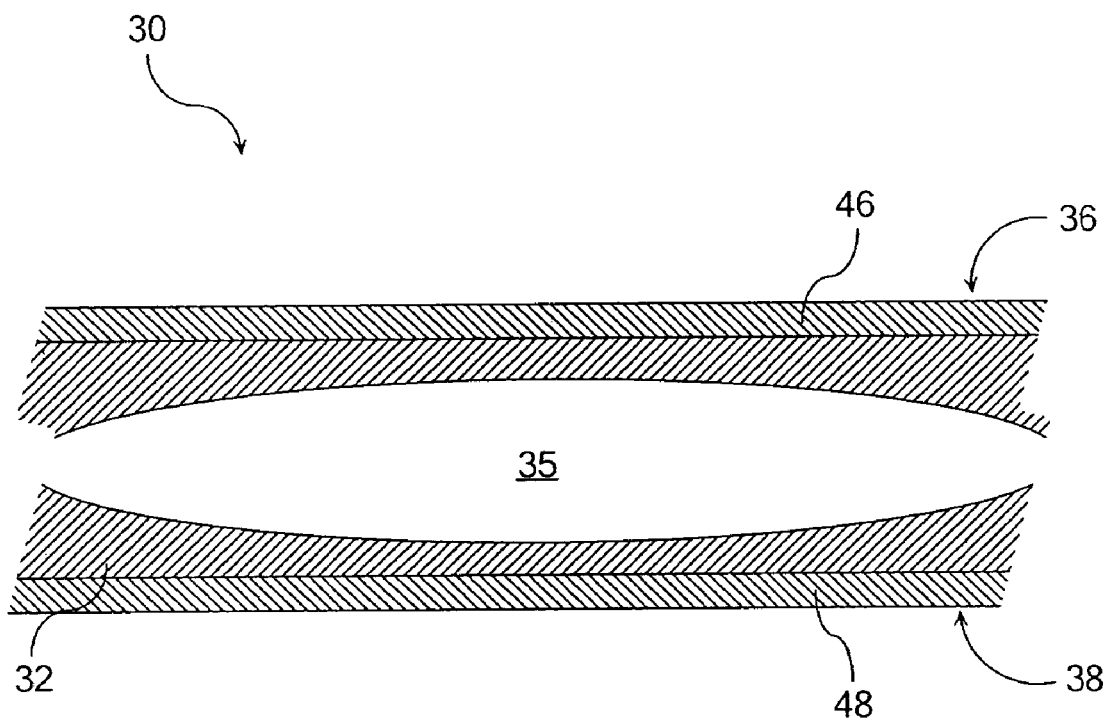
FIG. 2 is a cross-sectional illustration of a nitrided portion of a bipolar plate according to one embodiment of the present invention.
Figure 3:
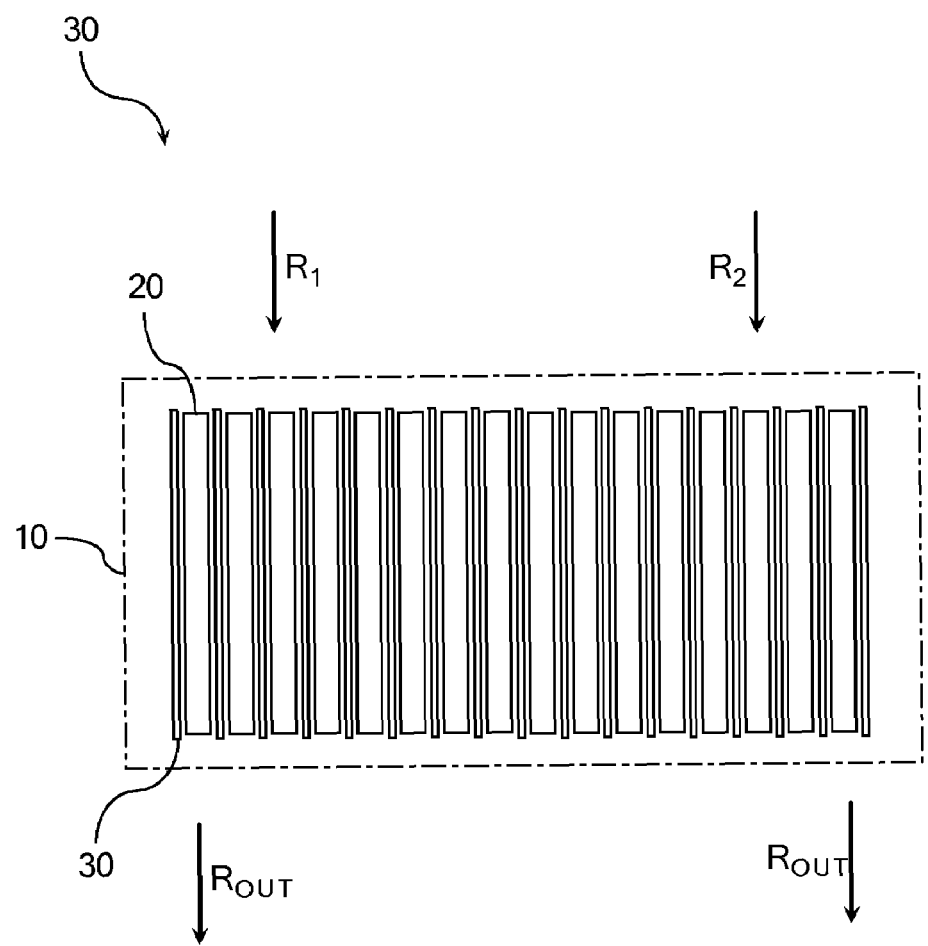
FIG. 3 is a schematic illustration of an electrochemical conversion assembly according to one embodiment of the present invention.

Referring to FIGS. 1-3, an electrochemical conversion assembly 10 according to the present invention is illustrated. Generally, the electrochemical conversion assembly 10 comprises a plurality of electrochemical conversion cells 20 and a plurality of electrically conductive bipolar plates 30. A variety of conversion assembly configurations are contemplated by the present invention, as long as the assembly utilizes one or more bipolar plates 30 between some or all of the respective electrochemical conversion cells 20. Indeed, the specific structure of the conversion assembly 10 and the individual conversion cells 20, is beyond the scope of the present invention and may be gleaned from any existing or yet to be developed teachings related to the design of an assembly that is capable of generating electricity from first and second chemical reactant supplies $R_1$, $R_2$ in communication with the electrochemical conversion cells 20. One or more reactant outlets $R_{OUT}$ are also typically provided.

Many aspects of the specific configuration of the bipolar plates 30 according to the present invention are also beyond the scope of the present invention. For example, referring specifically to FIG. 1, a bipolar plate 30 according to the present invention may comprise a flowfield portion 32 and fluid header portions 34 coupled to the flowfield portion 32. As is illustrated in FIG. 2, the flowfield portion 32 can include flowfield channels 35 defined between opposite, electrically conductive sides 36, 38 of the bipolar plate 30.

As is illustrated in FIG. 3, adjacent electrochemical conversion cells 20 are separated by respective ones of the plurality of bipolar plates 30. The bipolar plates 30 comprise an alloy of Fe and Cr and include a surface portion that comprises a single phase nitrided structure. Specifically, referring to FIG. 2, the illustrated single phase nitrided structure defines respective nitrided layers 46, 48 along opposite sides 36, 38 of the bipolar plate 30. In this manner, the nitrided layers 46, 48 defined on opposite sides of a selected bipolar plate 30 can be placed in electrical contact with a corresponding electrochemical conversion cell 10 in the conversion assembly 10. Typically, the bipolar plates 30 will contact the gas diffusion media layers of the electrochemical conversion cell 10.

The single phase nitrided structure may be produced by any suitable fabrication process. It is believed that this is achieved by forming a homogenous and adherent single-phase layer known as expanded austenite. This single-phase layer is also referred to in the literature as a gamma N, S or m phase. Temperatures above 400° C. normally result in the formation of mixed phases, which perform poorly as they are more likely to exhibit significant corrosion. The formation of CrN precipitates, for instance, normally leads to the deterioration of both pitting corrosion resistance and homogenous corrosion resistance.

One fabrication process that yields the expanded austenite phase and has achieved high corrosion resistance without significant sacrifice to the mechanical and electrical properties of the alloy comprises a plasma nitriding process. During nitriding, it is often advantageous to maintain the temperature of the bipolar plates at about 375° C. or above about 350° C. and below about 400° C. The temperature of a bipolar plate being processed can be monitored by utilizing a thermocouple secured to the plate during processing. Where the thickness or some other aspect of the plate does not permit effective use of a thermocouple, the temperature of the bipolar plate can be monitored by monitoring the temperature of a dummy plate configured to mimic the thermodynamic properties of the bipolar plate.

At least one class of suitable plasma nitriding processes is characterized by a pressure of between about 0.5 Torr and about 5.0 Torr, and a bias voltage of between about 350V and about 650V. Other embodiments are characterized by a pressure of between about 1.5 Torr and about 2.0 Torr, and a bias voltage of between about 580V and about 630V. In many instances, the impedance of the plasma is dependent on the gas composition and pressure. Accordingly, the suitability of particular voltage values will often be a function of gas composition and pressure. Further, those practicing the present invention should be aware that if one uses a secondary heat source, the electric parameters controlling the plasma could be varied independently of temperature of the part. In this manner, the present invention may be practiced at relatively lower voltage and current in the plasma by partially heating the part with a suitable supplemental heating element.

The plasma nitriding process can be characterized by the utilization of a process gas comprising $N_2$ and $H_2$. Specific embodiment of the present invention employ a process gas composition of about 20% $N_2$ and about 80% $H_2$, by weight. Typical nitriding durations in this context extend for about 4 hours. It is noted that nitriding is a diffusion controlled process and that the thickness of the nitrided layer depends on the diffusing species, diffusing medium, diffusion temperature, duration of diffusion, and type of diffusion process (salt bath, gas, diode plasma, ion implantation, etc.). For example, the subject matter of FIG. 2 is not necessarily illustrated to scale and it is contemplated that, where a bipolar plate 30 is characterized by a thickness of between about 100 µm and about 500 µm, the single phase nitrided structure defines a thickness of between about 0.001 µm and about 25 µm.

Suitable alloys may be selected from a variety of materials including, but not limited to, alloys comprising Ni, Mo, Mn, Si, C, or N, in combination with Fe and Cr, stainless steels, austenitic stainless steels, etc.

As is noted above, the specific structure of the conversion assembly 10 and the individual conversion cells 20, is beyond the scope of the present invention. However, it is noted that typical conversion assemblies comprise respective membrane electrode assemblies that are configured to operate with hydrogenous gas and air as the respective reactant supplies. Again by way of illustration and not limitation, the electrochemical conversion cells 20 may comprise respective electrolytic membranes, gaseous diffusion layers, catalytic components, carbonaceous components, electrically conductive components, and combinations thereof. Finally, although the bipolar plates 30 illustrated in FIGS. 1 and 2 comprise a flowfield defined between the opposite, electrically conductive sides of the bipolar plate 30, it is contemplated that suitable bipolar plate configurations need not include a flowfield.

Figure 4:
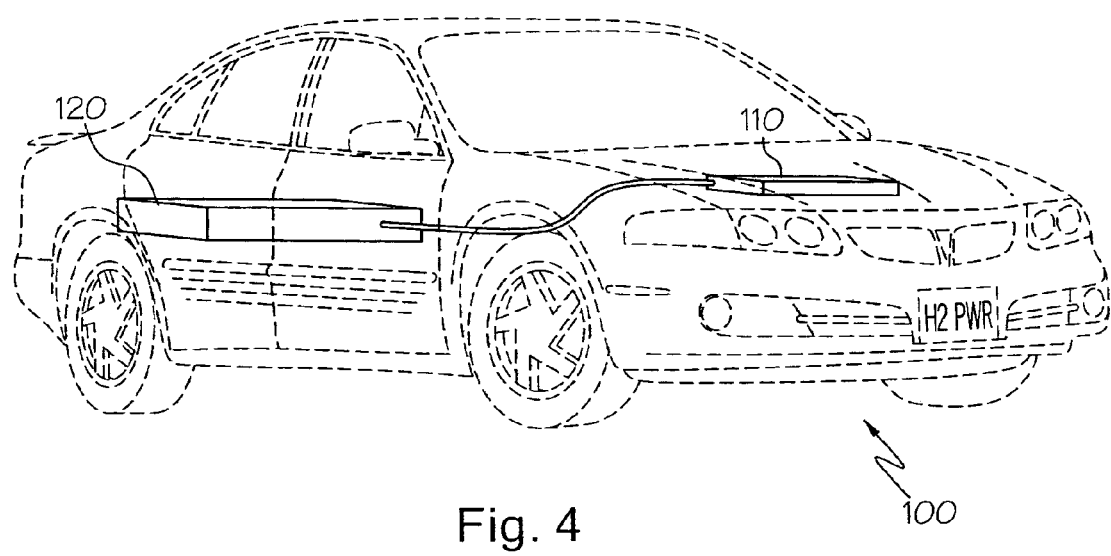
FIG. 4 is a schematic illustration of a vehicle having a fuel processing system and an electrochemical conversion assembly according to one embodiment of the present invention.

Referring to FIG. 4, a device according to the present invention may comprise a vehicle 100 and an electrochemical conversion assembly 110 according to the present invention. The electrochemical conversion assembly 110 can be configured to at least partially provide the vehicle 100 with motive power. The vehicle 100 may also have a fuel processing system or fuel source 120 configured to supply the electrochemical conversion assembly 110 with fuel.

Although the present invention is not limited to any specific reactant compositions, it will be appreciated by those practicing the present invention and generally familiar with fuel cell technology that the first reactant supply $R_1$ typically comprises oxygen and nitrogen while the second reactant supply $R_2$ comprises hydrogen.

It is noted that terms like "preferably," "commonly," and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

For the purposes of describing and defining the present invention it is noted that the term "device" is utilized herein to represent a combination of components and individual components, regardless of whether the components are combined with other components. For example, a "device" according to the present invention may comprise an electrochemical conversion assembly or fuel cell, a vehicle incorporating an electrochemical conversion assembly according to the present invention, etc.

For the purposes of describing and defining the present invention it is noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

Having described the invention in detail and by reference to specific embodiments thereof, it will be apparent that modifications and variations are possible without departing from the scope of the invention defined in the appended claims.

More specifically, although some aspects of the present invention are identified herein as preferred or particularly advantageous, it is contemplated that the present invention is not necessarily limited to these preferred aspects of the invention.

The invention claimed is:

1. A device comprising an electrochemical conversion assembly, said electrochemical conversion assembly comprising a plurality of electrochemical conversion cells and a plurality of electrically conductive bipolar plates, wherein:
   said electrochemical conversion cells are configured to communicate with first and second reactant supplies;
   adjacent ones of said electrochemical conversion cells are separated by respective ones of said plurality of bipolar plates;
   said bipolar plates comprise an alloy comprising iron and chromium;
   a single phase nitrided expanded austenite surface portion of said bipolar plates consists essentially of austenitic stainless steel and nitrogen; and
   said single phase nitrided expanded austenite surface portion of said bipolar plates is in contact with portions of said electrochemical conversion cells.

2. A device as claimed in claim 1 wherein said single phase nitrided expanded austenite surface portion is positioned along opposite sides of said bipolar plates such that each contacts one of a pair of electrochemical conversion cells separated by said bipolar plate.

3. A device as claimed in claim 1 wherein said single phase nitrided expanded austenite surface portion defines a thickness of between about 0.5 µm and about 6.0 µm.

4. A device as claimed in claim 1 wherein said first reactant supply comprises a source of hydrogenous gas and said second reactant supply comprises a source of air.

5. A device as claimed in claim 1 wherein said bipolar plates comprise a flowfield defined between opposite, electrically conductive sides of said bipolar plate.

6. A device as claimed in claim 1 wherein said electrochemical conversion cells comprise respective membrane electrode assemblies.

7. A device as claimed in claim 1 wherein said electrochemical conversion cells comprise respective electrolytic membranes, gaseous diffusion layers, catalytic components, carbonaceous components, electrically conductive components, and combinations thereof.

8. A device as claimed in claim 1 wherein said device further comprises a fuel processing system or fuel source for providing a hydrogenous gas to said electrochemical conversion assembly.

9. A device as claimed in claim 1 wherein:
   said device further comprises a vehicle; and
   said electrochemical conversion assembly is configured to at least partially provide said vehicle with motive power.

10. A device comprising an electrochemical conversion assembly, said electrochemical conversion assembly comprising a plurality of electrochemical conversion cells and a plurality of electrically conductive bipolar plates, wherein:
   said electrochemical conversion cells comprise respective membrane electrode assemblies and are configured to communicate with first and second reactant supplies;
   said first reactant supply comprises a source of hydrogenous gas;
   said second reactant supply comprises a source of air;
   adjacent ones of said electrochemical conversion cells are separated by respective ones of said plurality of bipolar plates;
   said bipolar plates comprise an alloy comprising iron and chromium;
   said bipolar plates comprise a flowfield defined between opposite, electrically conductive sides of said bipolar plate;
   a single phase nitrided expanded austenite surface portion of said bipolar plates consists essentially of austenitic stainless steel and nitrogen and is positioned along opposite sides of said bipolar plates such that each contacts one of a pair of electrochemical conversion cells separated by said bipolar plate.

* * * * *